United States Patent
Stevens et al.

(10) Patent No.: US 8,559,353 B2
(45) Date of Patent: Oct. 15, 2013

(54) MULTICAST QUALITY OF SERVICE MODULE AND METHOD

(75) Inventors: Christoph Stevens, Stekene (BE); Pascal Marie Edouard Julien Justen, Sint-Pieters-Woluwe (BE); Luc Vermoesen, Bornem (BE); Jourik De Loof, Aartselaar (BE); Tom Van Leeuwen, Wondelgem (BE); Willem Jozef Amaat Acke, Rijmenam (BE); Werner Mario Liekens, Sint Katelijne Waver (BE)

(73) Assignee: Alcatel Lucent, Paris (FR)

( * ) Notice: Subject to any disclaimer, the term of this patent is extended or adjusted under 35 U.S.C. 154(b) by 258 days.

(21) Appl. No.: 13/130,017

(22) PCT Filed: Nov. 30, 2009

(86) PCT No.: PCT/EP2009/008659
§ 371 (c)(1),
(2), (4) Date: Jul. 20, 2011

(87) PCT Pub. No.: WO2010/069480
PCT Pub. Date: Jun. 24, 2010

(65) Prior Publication Data
US 2011/0274109 A1 Nov. 10, 2011

(30) Foreign Application Priority Data
Dec. 16, 2008 (EP) .................................. 08291200

(51) Int. Cl.
*H04H 20/71* (2008.01)
*H04L 12/28* (2006.01)
*G06F 15/16* (2006.01)
(52) U.S. Cl.
USPC ...... 370/312; 370/395.21; 370/401; 370/432; 709/231; 709/232

(58) Field of Classification Search
None
See application file for complete search history.

(56) References Cited

U.S. PATENT DOCUMENTS 7,933,274 B2 * 4/2011 Verma et al. ............. 370/395.21
2007/0211632 A1 * 9/2007 Song et al. .................... 370/230
(Continued)

FOREIGN PATENT DOCUMENTS

WO WO-2007081171 A1 7/2007

OTHER PUBLICATIONS

UPNP Forum: "UPnP-QoS Architecture: 3". Internet Citation, Nov. 30, 2008, pp. 1-47, XP002521469.

(Continued)

*Primary Examiner* — Yemane Mesfin
*Assistant Examiner* — Christine Duong
(74) *Attorney, Agent, or Firm* — Harness, Dickey & Pierce

(57) ABSTRACT

The present application describes a Qos module for use in a home network that comprises a plurality of devices and a home gateway. The home gateway is enabled to receive a multicast stream and to forward the multicast stream to at least one of the devices under control of a multicast proxy module. The Qos module further comprises the multicast proxy module for also sending, upon reception of a multicast join message from one of the devices for joining the multicast stream, a Quality of Service request. The Quality of Service request comprising an address of the home gateway and an address of said device. The Qos module further comprises a unicast Quality of Service control module for reception of the Quality of Service request and for sending a unicast Quality of Service event message in order to request thereby provision of Quality of Service for the multicast stream when being forwarded from the home gateway to the device.

7 Claims, 1 Drawing Sheet

(56) References Cited

U.S. PATENT DOCUMENTS

| | | |
|---|---|---|
| 2007/0286074 A1* | 12/2007 | Xu .............................. 370/230 |
| 2008/0080534 A1* | 4/2008 | Lee et al. ...................... 370/401 |
| 2008/0112320 A1 | 5/2008 | van Willigenburg |
| 2008/0181117 A1* | 7/2008 | Acke et al. ................. 370/236.2 |
| 2010/0005154 A1 | 1/2010 | Song et al. |
| 2010/0095002 A1* | 4/2010 | Viger et al. ................... 709/226 |

OTHER PUBLICATIONS

Sangjae Lee et al.: "Qos-adjustable home gateway for IPTV service", Consumer Electronics, 2005. ICCE. 2005 Digest of Technical Papers. International Conference on Las Vegas, NV, USA Jan. 8-12, 2005. XP010796698.

International Search Report.

* cited by examiner

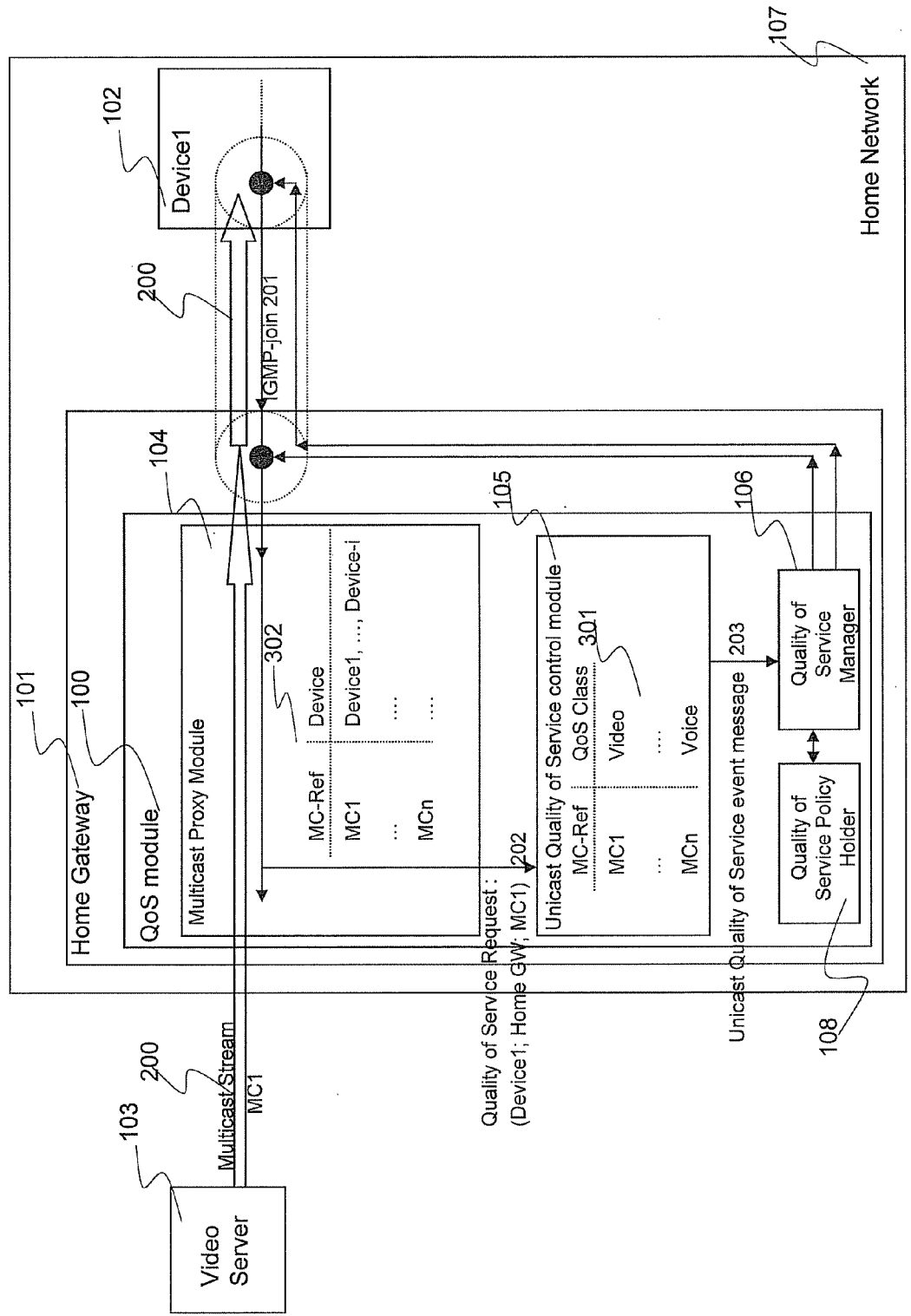

MULTICAST QUALITY OF SERVICE MODULE AND METHOD

The present invention relates to a Quality of service Qos module for use in a home network and related method. Such a home network typically comprises a plurality of devices and a home gateway. The home gateway can be enabled to receive a multicast stream and to forward the multicast stream & multicast control traffic to at least one of the devices under control of a multicast proxy module.

It has to be explained that Multicast is a network addressing method for the delivery of information to a group of destinations that are simultaneously using the most efficient strategy to deliver the messages over each link of the network only once, creating copies only when the links to the multiple destinations split. The word "multicast" is typically used to refer to IP Multicast, which is often employed for streaming media and Internet television applications. In IP Multicast the implementation of the multicast concept occurs on the IP routing level, where routers create optimal distribution paths for multicast streams that are sent to a multicast destination address spanning tree in real-time. The nodes in the network take care of replicating the packet to reach multiple receivers only where necessary. The most common low-level protocol to use multicast addressing is User Datagram Protocol UDP. Key concepts in IP Multicast include an IP Multicast group address, a multicast distribution tree and receiver driven tree creation. An IP Multicast group address is used by sources and the receivers to send and receive content. Sources use the group address as the IP destination address in their data packets. Receivers use this group address to inform the network that they are interested in receiving packets sent to that group.

The protocol used by receivers to join a group is called the Internet Group Management Protocol or IGMP. The Internet Group Management Protocol, shortly called IGMP, is a communications protocol used to manage the membership of Internet Protocol multicast groups. IGMP is used by IP hosts and adjacent multicast. IGMP can be used for online streaming video and gaming.

In certain topologies such as a tree-like topology, it is not necessary to run a multicast routing protocol. It is sufficient for a device to learn and proxy group membership information and simply forward multicast packets based upon that information. Such a multicast proxy module referred to as an IGMP proxy forwards the multicast data stream based solely upon Internet Group Management Protocol IGMP or Multicast Listener Discovery MLD membership information. Such an IGMP proxy module, having IGMP proxy support is e.g. described in the RFC4605 IGMP Proxy text—Network Working Group Request for Comment 4605 dd. August 2006 with title: "Internet Group Management Protocol (IGMP)/Mumticast Listener Discovery (MLS)—Based Multicast Forwarding ("IGMP/MLCD Proxying")".

In the event when multicast is further distributed in a home network, such above mentioned multicast proxy module usually controls a multicast stream via a home gateway towards different devices in a home network.

A problem that arises when exploiting multicast in the home network is that e.g. an Internet Service provider that provides a multicast stream such as distributed video towards the home network can not ensure that the required priority is given to the multicast stream in the home network and that appropriate bandwidth reservations are made within the home network for this multicast stream.

An object of the present invention is to provide a Qos module, in a home network that comprises a plurality of devices and a home gateway, and whereby the home gateway is enabled to receive a multicast stream and to forward the multicast stream to at least one of the devices in the home network under control of a multicast proxy module but whereby the Qos module is further enabled to provide Quality of Service for this multicast stream in the home network.

The object is achieved by comprising in the Qos module such a multicast proxy module and enabling the multicast proxy module to send, upon reception of a multicast join message of one of the devices in the home network for joining said multicast stream, a Quality of Service request that comprises an address of the home gateway and an address of the requesting device. In addition, the Qos module comprises a unicast Quality of Service Control Module for reception of such a Quality of Service request and for sending a unicast Quality of Service Event message in order to request thereby provision of Quality of Service for the multicast stream when the multicast stream is forwarded from the home gateway to the requesting device. It has to be explained that the Unicast Quality of Service event message can be sent to a unicast Qos-manager in the home network.

It has to be explained that in a home network often Universal Plug and Play UPnP protocol is installed. Universal Plug and Play UPnP is a set of computer protocols promulgated by the UPnP Forum. The goals of UPnP are to allow devices to connect seamlessly and to simplify the implementation of networks in home for services such as data sharing, communications, and entertainment; and in corporate environments for simplified installation of computer components. UPnP achieves this by defining UPnP device control protocols built upon open, Internet-based communication standards.

In addition UPnP provides Quality of Service for unicast traffic in the home networks by means of UPnP Qos.

Quality of Service QoS, is an important service function for use with UPnP for e.g. Audio and Video. QoS for UPnP consist of service functions for a unidirectional traffic stream between two devices and describes classes such as e.g.:

Traffic Class that indicates the kind of traffic in the traffic stream such as e.g. audio, video, . . . , Traffic Identifier which identifies data packets as belonging to a unique traffic stream.

Traffic Specification which contains a set of parameters that defines the characteristics of the traffic stream, such as e.g. operating requirement and scheduling.

An overall architecture of the UPnP QoS system and the interaction between various components comprises a Control Point application/module which is assumed to have the knowledge of source, sink and the content that has to be streamed. When the control point discovers the source and the sink along with content that is to be streamed, it requests a Quality of Service Manager Qos-Manager in the network to setup a QoS traffic stream. The control point creates a Traffic Descriptor structure and forwards it to the Qos-Manager. The Qos-Manager module requests on its turn to the Quality of Service policy holder the appropriate policy for the respective Traffic Descriptor. Based on this policy, the Qos-Manager is able to configure the respective source and sink devices for handling the new traffic in line with the relative importance of a particular traffic stream that was set by the Qos policy holder. In this way, a centralized UPnP Qos mechanism for enabling or disabling Admission Policy for the entire home network is provided. Traffic is classified according to information provided in the request for Quality, of Service for a particular traffic stream. The type of information is provided in a Traffic Descriptor that includes, among other items, traffic class, the source and destination network IP addresses for the stream, and the protocol. Whenever a QoS resource request is made, it is forwarded to the Qos Policy Holder Service by the Qos Manager Service. The Qos Policy Holder Service then examines the information provided in the request and returns the importance, in Traffic Policy, that shall be given to the traffic stream.

According to the present application, support is provided for a multicast stream, in the home network, which is coming from the access network. With for instance UPnP enabled home network devices, Qos UPnP is supported for a multicast stream on which one of the home network devices, such as a Customer Premises Equipment or Settop-Box, is subscribed to. The Settop-box in the home network subscribes itself on a multicast stream coming from the access network through the service gateway in the home network. This home/service gateway uses snooping of the multicast join messages e.g. IGMP messages, to further setup and to establish Quality of service on the incoming Real-time Transport Protocol/User Datagram Protocol RTP/UDP multicast stream. This is realized by this actual Qos method by means of launching a Quality of Service Request. This Quality of Service Request can be implemented by means of e.g. a web-service trigger or e.g. a UPnP message. This Quality of Service Request is captured by a unicast Quality of Service control module such as a UPnP Qos control point which is enabled to receive such a Quality of Service request. The unicast Quality of Service control module is further enabled to send, upon reception of the Quality of Service request, a unicast Quality of Service Event message for requesting thereby provision of Quality of Service for the multicast stream when being forwarded from the home gateway to the requesting device. This request is e.g. captured by a quality of service manager such as e.g. an UPnP Qos manager.

Optional, the multicast proxy module is further comprised for storing in a multicast membership database the address of the requesting device in association with a reference to the respective multicast stream.

Optional, the address of the device is implemented by means of a source Internet Protocol address or by means of a Media Access Control address of said device.

Similar, the address of the home gateway can optional be implemented by means of a Media Access Control address and Internet Protocol address of a transput of said home gateway coupled to the device.

Optional, the multicast proxy module is an Internet Group Management Protocol proxy for managing a membership of Internet Protocol multicast groups.

Optional, the unicast Quality of Service control module is UPnP enabled and implemented by means of an Universal Plug and Play control point which is associated to a service of enabling unicast Quality of Service for the respective multicast stream.

Furthermore, the Quality of Service request comprises also a reference to the respective multicast stream. This reference to the multicast stream is used to look up the associated Qos class in a look-up table based upon this reference to the respective multicast stream.

Such a look-up table comprises entries of a reference to the multicast stream in association with a predefined class of service. Such a reference of the multicast stream is usually implemented by means of a multicast Media Access Control address or a multicast Internet Protocol address. The associated class of service is e.g. voice, video, best effort, . . . .

Optional, such a look-up table that comprises a multicast stream reference with its associated class of service, can be comprised in a unicast Quality of Service control module, a Qos manager or a Qos Policy Holder such as e.g. a UPnP Qos Policy Holder.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein FIG. 1 represents a Home Network. The working of the Qos module according to the present invention in accordance with its telecommunication environment is shown in FIG. 1 and will be explained by means of a functional description of the different blocks shown therein. Based on this description, the practical implementation of the blocks will be obvious to a person skilled in the art and will therefore not be described in details. In addition, the principle working of the method to operate the Qos module will be described in further detail.

FIG. 1 shows the home network 107 that is coupled to a video server 103 in the core network. The home network 107 comprises a home gateway 101 coupled to the video server 103 to receive data for the home network 107. The home gateway 101 is coupled to a plurality of devices (only one is shown) such as device1 102.

The Qos module 100 according to the present application is comprised in the home gateway 101. The Qos module 100 comprises a multicast proxy module 104 and a unicast quality of service control module 105 being coupled to each other. The multicast proxy module 104 is coupled to device1 102. The Qos module 100 further comprises a quality of service manager 106 coupled to the unicast quality of service control module 105 and to a quality of service policy holder 108.

Let's assume that the unicast quality of service control module 105, the quality of service manager 106, the quality of service policy holder 108 and the device1 102 are UPnP enabled. And let's further assume that the Multicast proxy module 104 is an IGMP proxy.

The Device1 102 sends out an IGMP-join message 201 in order to request joining to the multicast stream MC1 with reference 200. This join message comprises a group address which is an identification for the multicast stream MC1 200.

The IGMP proxy 104 on the Home gateway 101 adds an entry to its membership database 302.

According to the present application, in order to support UPnP Qos, the entry in the membership database 302 on the Home Gateway 101 is extended with the source unicast IP address (or MAC address) of the device 1 102. It has to be remarked that the present application is not limited to the use of an IP address. A similar description based upon a MAC address of the device 1 102 is as well possible.

Hereafter, a quality of service request 202, such as a UPnp event, is launched by the IGMP Proxy 104 that contains the following information: IP address of the home gateway (shown by means of Home GW) and source IP address of the device 1 102 (shown by means of Device1). The unicast quality of service control module 105 being a UPnP Qos control point is enabled to catch the quality of service request event 202 and processes it in order to prepare a unicast quality of service event message. As being UPnP enabled, the unicast quality of service event message 203 is a TrafficId. During the processing the SourceAdress and DestinationAddress of a UPNP Qos parameter TrafficId is filled in.

The UPnP Qos control point 105 also needs the class of service for the service traffic that needs to be Qos provisioned. Herefore, the UPnP Qos control point 105 creates and keeps a look-up table 301 that comprises a relation between a reference for the multicast stream such as e.g. the Multicast IP address and a class of service such as e.g. voice, video, best effort, . . . .

A possible implementation is that the multicast reference is included in the quality of service request 202 (shown in the FIG. 1 by means of MC1) and that the unicast quality of service control module 105 retrieves the multicast IP address from the quality of service request 202 and uses it to look up the associated Qos class in its look-up table 301.

It has to be explained that the look-up table 301 might as well be comprised in the service manager 106 or the service policy holder 108.

When the class of service is determined for the multicast stream MC1, the class of service is filled in the UPnP Qos parameter TrafficClass which is part of the UPnP Qos parameter Tspec and on its turn part of the UPnP Qos parameter TrafficDescriptor.

During a following step a QosManager:RequestTrafficQos or a QosManager:RequestExtendedTrafficQos is triggered at the Quality of service manager 106 for that particular multicast stream MC1 with the QosBoundarySourceAddress address being implemented by the IP address of the Device1 102 and the QosBoundaryDestinationAddress being implemented by the IP address of the home gateway 101.

In this way the quality of service manager sets up the Qos for the multicast stream MC1 being forwarded by the home gateway 101 towards the Device1 102. This is shown by the two arrows leaving the quality of service manager i.e. one towards the home gateway 101 transput which is coupled to the Device1 102 and the other arrow towards the Device1 102 itself. Hereby FIG. 1 shows a Qos—bandwidth pipe between the home gateway 101 and the Device1 102 which comprises the Multicast stream MC1.

As such, an additional entry of the address of the Device1 in the multicast database of the IGMP proxy, in association with a reference to said multicast stream, and the launching of the quality of service request by the IGMP proxy, leads to the setup of UPnP Qos for a particular multicast stream.

A similar principle can be applied to trigger a release UPnP Qos. As such a multicast leaving message is received by the multicast proxy module 104 from a device that desires to leave the multicast tree, hereafter called the leaving device (not shown). Upon reception of such a multicast leaving message, the entry of the leaving device in the multicast database 302 of the multicast proxy module 104 is removed. Moreover, a message e.g. a "quality of service release event" (not shown) is launched by the multicast proxy module 104 into the Home gateway 101. Such a message contains preferably the following information: the IP address (or MAC address) of the Home Gateway 101 and the IP address (or MAC address) of the leaving device. The unicast quality of service control module 105 is subscribed on such a "quality of service release event" and upon capturing of this event message, the unicast quality of service control module 105 knows that the multicast stream is no longer forwarded by the home gateway 101 towards the leaving device. Hereby, the UPnP QoS for the multicast stream is also released.

Furthermore, in the event when a second Device (not shown) also desires to subscribe on a multicast stream, e.g. MC1 with reference 200, upon which already at least one device is subscribed, the same basic principle according to the present application is applied. An additional UPnP Qos setup for the multicast stream MC1 that is forwarded from the home gateway 101 towards the second QoS Device is realized.

Finally, it has to be explained that in the event when a home network device is enabled to use IGMP and UPnP Qos i.e. the device comprises an UPnP Qos Control Point by itself, the device is enabled to setup the Qos for the requested multicast stream by itself. In such a situation, the unicast quality of service control point 105 of the home gateway 101 shouldn't setup or release Qos for the same multicast stream since Qos is or will be set up by the UPnP control point of this particular Device.

In order to avoid double Qos provision for the same multicast stream the unicast quality of service control module 105 of the home gateway 101 executes an inquiry on all UPnP Qos devices to control whether UPnP Qos has already been setup for a particular multicast stream by the UPnP Qos Control point of one of the devices. This inquiry is executed prior to launching of a unicast quality of service event message 203. Indeed, a device with UPnP Qos support can setup Qos prior to requesting of the multicast stream in or to e.g. install Qos before the multicast stream has been sent.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A home gateway comprising a Quality of Service (QoS) module for use in a home network that comprises a plurality of devices and the home gateway, said home gateway being enabled to receive a multicast stream and to forward said multicast stream to at least one of said devices under control of a multicast proxy module, wherein said QoS module comprises:

said multicast proxy module configured to:
  send, upon reception of a multicast join message from one of said devices for joining said multicast stream, a QoS request comprising an address of said home gateway and an address of said device, said QoS request further comprising a reference to said multicast stream, and
  store in a multicast membership database said address of said device in association with said reference to said multicast stream;

a unicast QoS control module configured to:
  receive said QoS request, and
  send a unicast QoS event message for requesting thereby provision of QoS for said multicast stream when being forwarded from said home gateway to said device, said unicast QoS module further comprising a look-up table configured to look-up an associated QoS class in its look-up table based upon said reference to said multicast stream.

2. The home gateway according to claim 1, wherein said address of said device is anyone of a source Internet Protocol address and a Media Access Control address of said device.

3. The home gateway according to claim 1, wherein said address of said home gateway is anyone of a Media Access Control address and Internet Protocol address of a transput of said home gateway coupled to said device.

4. The home gateway according to claim 1, wherein said multicast proxy module is an Internet Group Management Protocol proxy configured to manage a membership of Internet Protocol multicast groups.

5. The home gateway according to claim 1, wherein said unicast QoS control module is a Universal Plug and Play control point being associated to a service of enabling unicast QoS for said multicast stream.

6. The home gateway according to claim 1, wherein said look-up table is comprised in anyone of said unicast QoS control module, a QoS manager and a QoS Policy Holder.

7. A method for use by a Quality of Service (QoS) module in a home network that comprises a plurality of devices and a home gateway, said home gateway being enabled to receive a multicast stream and to forward said multicast stream to at least one of said devices under control of a multicast proxy module, wherein said method comprises:

sending, by said multicast proxy module, upon reception of a multicast join message from one of said devices for joining said multicast stream, a QoS request comprising an address of said home gateway and an address of said device, said QoS request further comprising a reference to said multicast stream;

storing, by said multicast proxy module, in a multicast membership database said address of said device in association with said reference to said multicast stream;

receiving, by a unicast QoS control module, said QoS request;

sending, by said unicast QoS control module, a unicast QoS Event message for requesting thereby provision of QoS for said multicast stream when being forwarded from said home gateway to said device; and looking-up, by said unicast QoS control module, a QoS class associated with said reference to said multicast stream.

* * * * *